US 7,484,434 B2

(12) United States Patent
Jung et al.

(10) Patent No.: US 7,484,434 B2
(45) Date of Patent: Feb. 3, 2009

(54) TORSIONAL VIBRATION DAMPER

(75) Inventors: Jae Hoon Jung, Seongnam (KR); Tae Han Jee, Suwon (KR); Young Rae Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 762 days.

(21) Appl. No.: 10/882,117

(22) Filed: Jun. 30, 2004

(65) Prior Publication Data

US 2005/0126332 A1 Jun. 16, 2005

(30) Foreign Application Priority Data

Dec. 10, 2003 (KR) .................. 10-2003-0089550

(51) Int. Cl.
*F16F 15/12* (2006.01)
(52) U.S. Cl. .................................... 74/574.4
(58) Field of Classification Search ............... 74/572.2, 74/573.12, 574.4; 464/68.92, 68.4; 192/212, 192/213, 213.1
See application file for complete search history.

(56) References Cited

U.S. PATENT DOCUMENTS

| | | | | | |
|---|---|---|---|---|---|
| 4,747,801 | A | * | 5/1988 | Chasseguet et al. | 464/66.1 |
| 4,838,395 | A | * | 6/1989 | Chasseguet et al. | 188/378 |
| 4,959,039 | A | * | 9/1990 | Naudin | 464/66.1 |
| 5,156,067 | A | * | 10/1992 | Umeyama | 464/68.3 |
| 5,380,248 | A | * | 1/1995 | Kraus et al. | 464/66.1 |
| 5,810,140 | A | * | 9/1998 | Billet et al. | 192/3.29 |
| 5,996,761 | A | * | 12/1999 | Teramae | 192/205 |
| 6,047,804 | A | * | 4/2000 | Feldhaus et al. | 192/70.17 |
| 6,763,743 | B2 | * | 7/2004 | Watanabe et al. | 74/573.12 |
| 7,077,752 | B2 | * | 7/2006 | Rohs et al. | 464/67.1 |
| 7,140,966 | B2 | * | 11/2006 | Jee | 464/68.4 |
| 7,204,761 | B2 | * | 4/2007 | Jee | 464/68.92 |
| 7,241,224 | B2 | * | 7/2007 | Song et al. | 464/64.1 |
| 2006/0032717 | A1 | * | 2/2006 | Jee et al. | 188/379 |

FOREIGN PATENT DOCUMENTS

EP 1 460 304 A1 3/2004
KR 1020030081678 A 10/2003

* cited by examiner

*Primary Examiner*—Vicky A Johnson
(74) *Attorney, Agent, or Firm*—Morgan, Lewis & Bockius LLP (57) ABSTRACT

A torsional vibration damper is provided which includes a primary mass, a secondary mass, and a damping unit. The damping unit includes a plurality of coil springs, a pair of end guides, and a friction member. The plurality of coil springs are situated in series and disposed one after the other within the divided portions of the ring-shaped chamber. The pair of end guides are slidably disposed within each divided portion of the ring-shaped chamber and support outer ends of the end coil springs among the plurality of elastic members. The friction member is slidably disposed between neighboring elastic members, and it is configured to be rubbed against the primary mass in response to compressions of the coil springs such that a friction force is generated in proportion to a relative rotation between the primary and secondary masses.

12 Claims, 9 Drawing Sheets

TORSIONAL VIBRATION DAMPER

CROSS-REFERENCE TO RELATED APPLICATIONS

This application claims priority of Korean Application No. 10-2003-0089550, filed on Dec. 10, 2003, the disclosure of which is incorporated herein by reference.

FIELD OF THE INVENTION

The present invention relates to a torsional vibration damper for a vehicle.

BACKGROUND OF THE INVENTION

A torsional vibration damper, i.e., a dual mass flywheel, is generally used for damping a torsional vibration that is generated from the transmission of power between an output shaft of an engine and an input shaft of a transmission.

Typically, torsional vibration dampers include a first mass, a second mass, and a damping unit disposed between the first and second masses. The first mass is connected to the output shaft of the engine, and the second mass is connected to the input shaft of the transmission through a clutch mechanism. The first and second masses are connected to each other through the damping unit such that the first and second masses can rotate relative to each other.

Generally, the engine of a vehicle provides the driving force distributed to the wheels of the vehicle. However, at times the engine may be driven by an inertia force of the vehicle. Therefore, the first and second masses must be designed to rotate in both directions relative to each other.

When engine torque is substantially high and the vehicle is driven with a specific gear ratio, a relative rotation between the first and second masses reaches a limit. Furthermore, when the engine torque changes irregularly, the first and second masses may be dashed against a member for limiting the relative rotation of the first and second masses.

To solve such problems, the flywheel is designed to have a high level of damping characteristics. In the prior flywheel, when the relative rotation between the first and second masses occurs, a magnitude of torque cannot be regulated. Furthermore, a damping effect of the flywheel is almost constant even when the relative rotation between the first and second masses occurs.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides a torsional vibration damper that can realize variable damping characteristics according to a rotation speed and a relative rotation of a primary mass with respect to a secondary mass.

According to a preferred embodiment, the torsional vibration damper comprises a primary mass, a secondary mass, and a damping unit. The primary mass is adapted to be coupled to an engine crankshaft for rotation about a rotational axis of the engine crankshaft, and it defines a substantially ring-shaped chamber that is divided into at least two portions. The secondary mass is relatively rotatably connected to the primary mass and is connectable with a clutch. The damping unit couples the primary and secondary masses together in a rotationally elastic manner. The damping unit generally comprises a plurality of coil springs, a pair of end guides, and a friction member. The plurality of coil springs are situated in series and disposed one after the other within the divided portions of the ring-shaped chamber. The pair of end guides are slidably disposed within each divided portion of the ring-shaped chamber and support outer ends of the end coil springs among the plurality of elastic members. The friction member is slidably disposed between neighboring elastic members, and configured to be rubbed against the primary mass in response to compressions of the coil springs such that a friction force in proportion to a relative rotation between the primary and secondary masses is generated.

According to a preferred embodiment, the friction member comprises an outer guide, an inner guide, a first operator, and a second operator. The outer guide is provided with a first protrusion extending toward a center portion of the primary mass such that a first slanted surface and a second slanted surface are formed on both sides of the first protrusion. The inner guide is disposed to face the outer guide and provided with a second protrusion extending toward the outer guide such that a third slanted surface and a fourth slanted surface are formed on both sides of the second protrusion. The first operator is disposed between the outer and inner guides, and one end of the first operator is elastically supported by the coil spring. A first slanted portion, contacting the first and third slanted surfaces, respectively, is provided on the other end of the first operator. The second operator is disposed to face the first operator between the outer and inner guides, and one end of the second operator is elastically supported by the coil spring. A second slanted portion, contacting the second and fourth slanted surfaces, respectively, is provided on the other end of the second operator.

It is preferable that a width of the first protrusion becomes smaller as it becomes closer to the center portion of the primary mass, and that a width of the second protrusion becomes smaller as it becomes more distant from the center portion of the primary mass.

It is further preferable that a rate of decrease of the first protrusion width is different from the rate of decrease of the second protrusion. It is yet further preferable that the rate of decrease of the width of the first protrusion is greater than the rate of decrease of the second protrusion.

According to a preferred embodiment, the friction member further comprises a regulating coil spring disposed between the first and second operators such that the first and second operators are elastically supported by each other. It is also preferable that an outer end portion of the coil spring, supporting the first operator, contacts the first operator and an inner end portion thereof does not contact the first operator when the damping unit is not compressed. Preferably, an outer end portion of the coil spring, supporting the second operator, contacts the second operator and an inner portion thereof does not contact the second operator when the damping unit is not compressed.

Preferably, the torsional vibration damper further comprises a drive plate that is coupled to the secondary mass. The drive plate is configured to compress the damping unit when a relative rotation between the primary and secondary masses occurs. At least two compression fins are provided on a circumference of the drive plate and widths of the compression fins vary.

Preferably, an outer end portion of the coil spring supporting the end guide contacts the end guide and an inner end portion thereof does not contact the end guide when the damping unit is not compressed. According to a preferable embodiment, the outer guide contacts an outer wall of the ring-shaped chamber and the inner guide contacts an inner wall of the ring-shaped chamber when the coil springs supporting the first and second operators are compressed.

It is preferable that the friction member comprises a first outer guide, a second outer guide, and an inner guide. One end of the first outer guide is supported by the coil spring, and a first slanted surface is formed on the other end of the first outer guide. The second outer guide is disposed adjacent to the first outer guide. One end of the second outer guide is supported by the coil spring, and a second slanted surface is formed on the other end of the second outer guide. The inner guide is disposed to face the first and second outer guides, and it is provided with a protrusion having a third slanted surface contacting the first slanted surface and a fourth slanted surface contacting the second slanted surface. Preferably, a width of the protrusion becomes smaller as it becomes more distant from a center portion of the primary mass.

According to a further preferable embodiment, the friction member further comprises a regulating coil spring disposed between the first and second outer guides such that the first and second outer guides are elastically supported by each other.

It is also preferable that an outer end portion of the coil spring supporting the first outer guide contacts the first outer guide and an inner portion thereof does not contact the first outer guide when the damping unit is not compressed. An outer end portion of the coil spring, supporting the second outer guide, contacts the second outer guide and an inner end portion thereof does not contact the second outer guide when the damping unit is not compressed.

Preferably, the torsional vibration damper further comprises a drive plate that is coupled to the secondary mass and is configured to compress the damping unit when a relative rotation between the primary and secondary masses occurs. Also, at least two compression fins are provided on a circumference of the drive plate and the widths of the compression fins are different from each other.

It is preferable that an outer end portion of the coil spring, supporting the end guide, contacts the end guide and an inner end portion thereof does not contact the end guide when the damping unit is not compressed. Also, the first and second outer guides contact an outer wall of the ring-shaped chamber and the inner guide contacts an inner wall of the ring-shaped chamber when the coil springs supporting the first and second outer guides are compressed.

According to a preferred embodiment, the friction member comprises an outer guide, a first inner guide, and a second inner guide. The outer guide is provided with a protrusion extending toward a center portion of the primary mass such that a first slanted surface and a second slanted surface are formed on both sides of the protrusion. One end of the first inner guide is supported by the coil spring, and a third slanted surface contacting the first slanted surface is formed on the other end of the first inner guide. One end of the second inner guide is supported by the coil spring, and a fourth slanted surface contacting the second slanted surface is formed on the other end of the second inner guide. It is preferable that a width of the protrusion becomes smaller as it becomes closer to the center portion of the primary mass. The friction member further comprises a regulating coil spring disposed between the first and second inner guides such that the first and second inner guides are elastically supported by each other. An outer end portion of the coil spring, supporting the first inner guide, contacts the first inner guide and an inner end portion thereof does not contact the first inner guide when the damping unit is not compressed.

Further, an outer end portion of the coil spring, supporting the second inner guide, contacts the second inner guide and an inner portion thereof does not contact the second inner guide when the damping unit is not compressed.

It is further preferable that the torsional vibration damper further comprises a drive plate that is coupled to the secondary mass and is configured to compress the damping unit when a relative rotation between the primary and secondary masses occurs. At least two compression fins are provided on a circumference of the drive plate and widths of the compression fins are different from each other.

It is preferable an outer end portion of the coil spring supporting, the end guide contacts the end guide and an inner end portion thereof does not contact the end guide when the damping unit is not compressed. Also, the outer guide contacts an outer wall of the ring-shaped chamber and the first and second inner guides contact an inner wall of the ring-shaped chamber when the coil springs supporting the first and second inner guides are compressed.

According to yet another embodiment, the friction member comprises an outer guide, an outer wedge, a first elastic unit, an inner wedge, an inner guide, a second elastic unit, a first operator, and a second operator. The outer wedge is disposed adjacent to the outer guide and provided with a first slanted portion extending toward a center portion of the primary mass. The first elastic unit is disposed between the outer guide and the outer wedge. The inner wedge is disposed to face the outer wedge and provided with a second slanted portion extending toward the outer wedge. The inner guide is disposed adjacent to the inner wedge. The second elastic unit is disposed between the inner wedge and the inner guide. The first operator is disposed between the outer and inner wedges, one end of the first operator is elastically supported by the coil spring, and a third slanted portion, contacting the first and second slanted portions, is provided on the other end of the first operator. The second operator is disposed to face the first operator between the outer and inner wedges. One end of the second operator is elastically supported by the coil spring, and a fourth slanted portion, contacting the first and second slanted portions, is provided on the other end of the second operator.

It is still further preferable that a width of the first slanted portion becomes smaller as it becomes closer to a center portion of the primary mass and that a width of the second slanted portion becomes smaller further from the center portion of the primary mass. It is still further preferable that a rate of decreasing of the width of the first slanted portion and that of the second slanted portion are different from each other. Preferably, the rate of decreasing of the width of the first slanted portion is greater than that of the second slanted portion.

According to a preferred embodiment, each of the first and second elastic members is a disc spring.

It is also preferable that an outer end portion of the coil spring, supporting the first operator, contacts the first operator and an inner portion thereof does not contact the first operator when the damping unit is not compressed. It is also preferable that an outer end portion of the coil spring, supporting the second operator, contacts the second operator and an inner portion thereof does not contact the second operator when the damping unit is not compressed.

It is preferable that the torsional vibration damper further comprises a drive plate that is coupled to the secondary mass and is configured to compress the damping unit when a relative rotation between the primary and secondary masses occurs. At least two compression fins are provided on a circumference of the drive plate and the widths of the compression fins are different from each other.

It is still preferable that an outer end portion of the coil spring, supporting the end guide, contacts the end guide and an inner end portion thereof does not contact the end guide when the damping unit is not compressed. The outer guide contacts an outer wall of the ring-shaped chamber and the inner guide contacts an inner wall of the ring-shaped chamber when the coil springs supporting the first and second operators are compressed. Preferably, at least one bushing is disposed between the primary and secondary masses. It is also preferred that the ring-shaped chamber is at least partially filled with lubrication oil.

The torsional vibration damper further comprises a drive plate that is coupled to the secondary mass and is configured to compress the damping unit when a relative rotation between the primary and secondary masses occurs.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Figure 1:
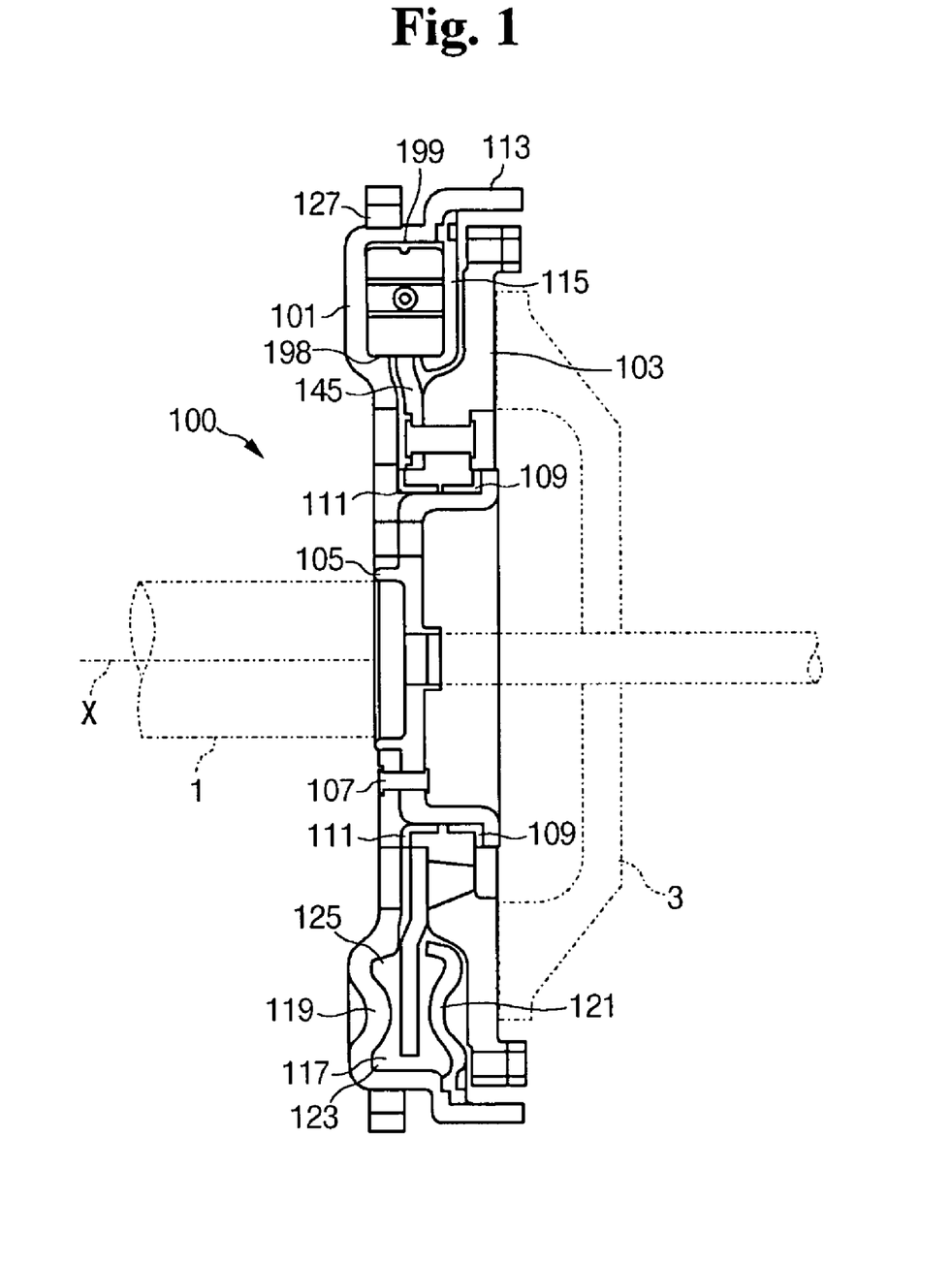
FIG. 1 is a sectional view of a torsional vibration damper according to an embodiment of the present invention as viewed approximately along line A-A in FIG. 2.
Figure 2:
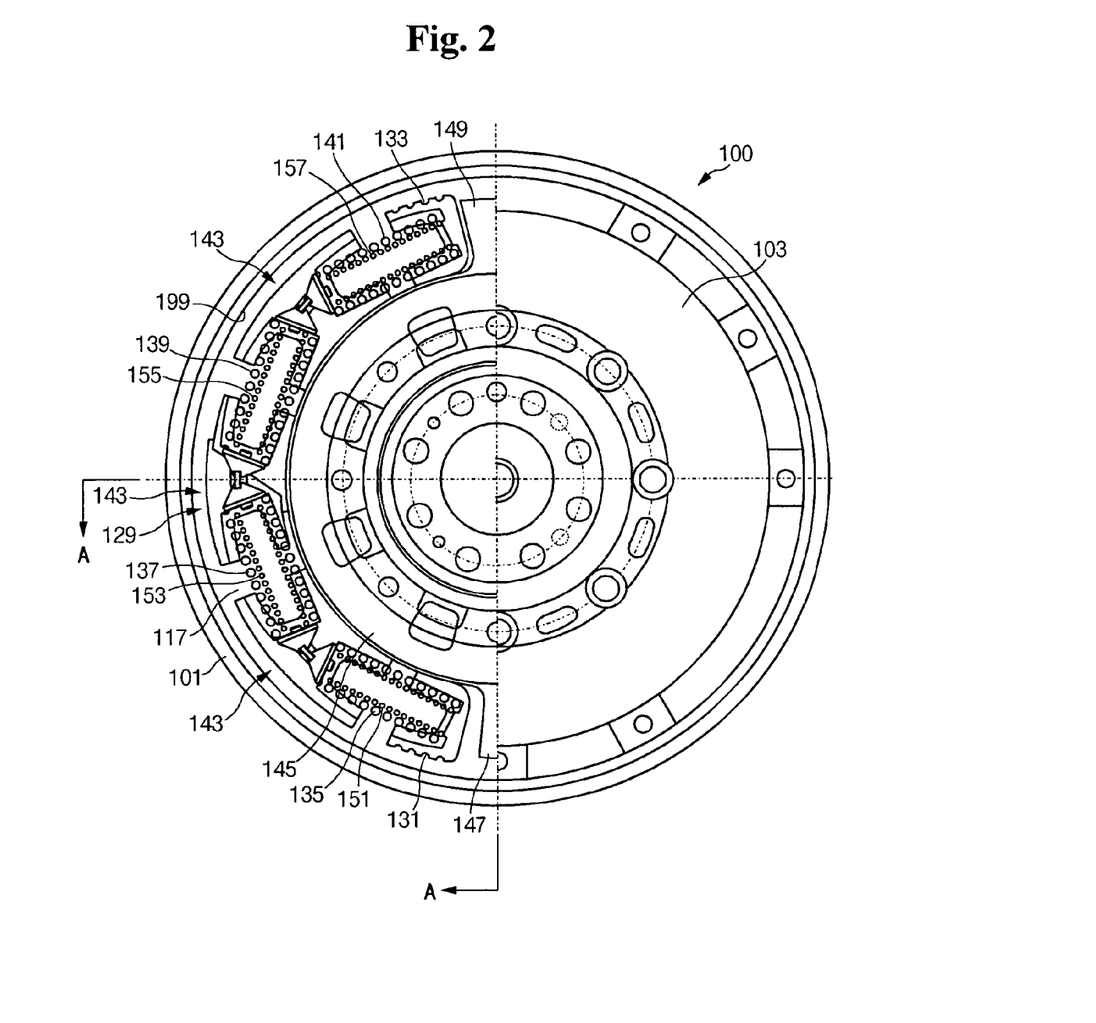
FIG. 2 is a partially broken-away plan view showing an inner structure of the torsional vibration damper of FIG. 1.

Referring to FIGS. 1-6, a torsional vibration damper 100 according to an embodiment of the present invention will be explained. As shown in FIGS. 1 and 2, the torsional vibration damper 100 is disposed between an engine and a transmission, and functions to damper torsional vibration that is generated during power transmission. The torsional vibration damper 100 can be used between any power transmission portion, in addition to between the engine and the transmission.

In an exemplary embodiment, a primary mass 101 is adapted to be coupled to an engine crankshaft 1 for rotation about a rotational axis "X" of the engine crankshaft 1. A secondary mass 103 is relatively rotatably connected to the primary mass 101 and is configured to be connectable with a clutch 3. A hub 105 is coupled to a center portion of the primary mass 101 through a rivet 107, and the secondary mass 103 is rotatably connected to the hub 105 through a pair of bushings 109 and 111. Thus, the secondary mass 103 is rotatably connected to the primary mass 101.

Because the primary and secondary masses, 101 and 103, are connected to each other through two bushings 109 and 111, torsional stress acting on each of the bushings 109 and 111 is decreased so distortion of the bushings 109 and 111 can be minimized.

As shown in FIGS. 1 and 2, the primary mass 101 can have a shape of a circular plate, although it will be appreciated by one of ordinary skill in the art that the masses can be of any appropriate shape.

A folded edge portion 113 is provided around the edge of the primary mass 101 and a cover 115 is coupled to the edge portion 113, thereby defining a ring-shaped chamber 117 around the circumference of the primary mass 101.

The ring-shaped chamber 117 is divided into at least two portions by a first protrusion 119 formed on the primary mass 101 and a second protrusion 121 formed on the cover 115. For example, the ring-shaped chamber 117 is divided into two portions, with a pair of protrusions 119 and 121 at the top and bottom of the torsional vibration damper 100. In alternative embodiments, the ring-shaped chamber 117 can be divided into more than two portions by using more than two pairs of protrusions. The ring-shaped chamber 117 is preferably at least partially filled with lubrication oil.

The first and second protrusions 119 and 121 are preferably formed near a radial center portion of the ring-shaped chamber 117 so that lubrication oil passageways 123 and 125 are formed on both sides of the first and second protrusions 119 and 121. The lubrication oil can move between the divided portions of the ring-shaped chamber 117 through the lubrication oil passageways 123 and 125, so that lubrication oil can be prevented from gathering in one of the divided portions.

A ring gear 127 is formed in an outer circumference of the primary mass 101. The ring gear 127 is for connection with a start motor.

A damping unit 129 is disposed in each divided portion of the ring-shaped chamber 117. The damping unit 129 couples the primary and secondary masses 101 and 103 in a rotationally elastic manner. Damping characteristics of the damping unit 129 varies in response to a relative rotation between the primary and secondary masses 101 and 103.

According to FIG. 2, the damping unit 129 includes a pair of end guides 131 and 133, a plurality of coil springs 135, 137, 139, and 141, and a friction member 143. Auxiliary coil springs 151, 153, 155, and 157 are respectively disposed within the coil springs 135, 137, 139, and 141. Therefore, each pair of springs can provide a two-step damping coefficient. The coil springs 135, 137, 139, and 141 are situated in series and disposed one after the other within the divided portions of the ring-shaped chamber. In an alternate embodiment, other suitable elastic members that can be compressed and provide an elastic force can be used in place of the springs, as will be appreciated by one of ordinary skill in the art.

The end guides 131 and 133 are slidably disposed within the ring-shaped chamber 117, and the end guides 131 and 133 respectively support outer ends of the end coil springs 135 and 141 among the coil springs 135, 137, 139, and 141. The end guides 131 and 133 are supported by the first and second protrusions 119 and 121.

Figure 3:
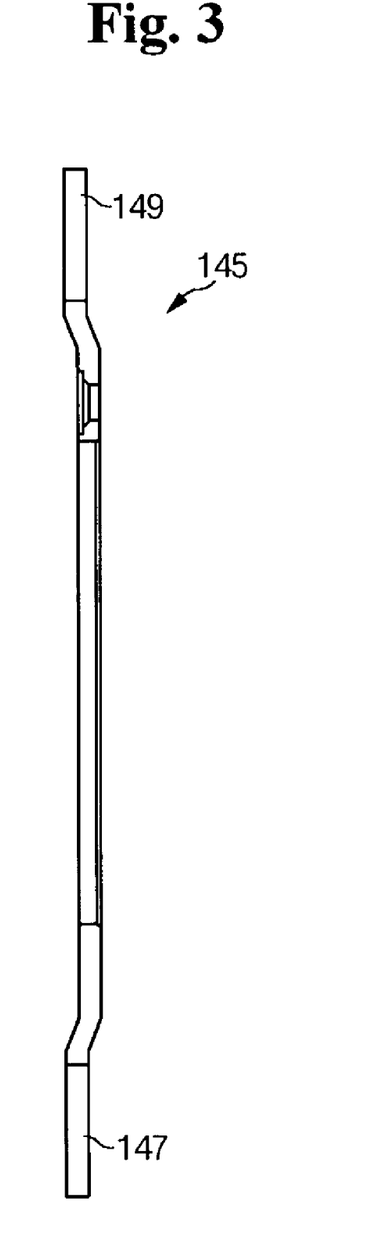
FIGS. 3 and 4 show a drive plate of the torsional vibration damper of FIG. 1.
Figure 4:
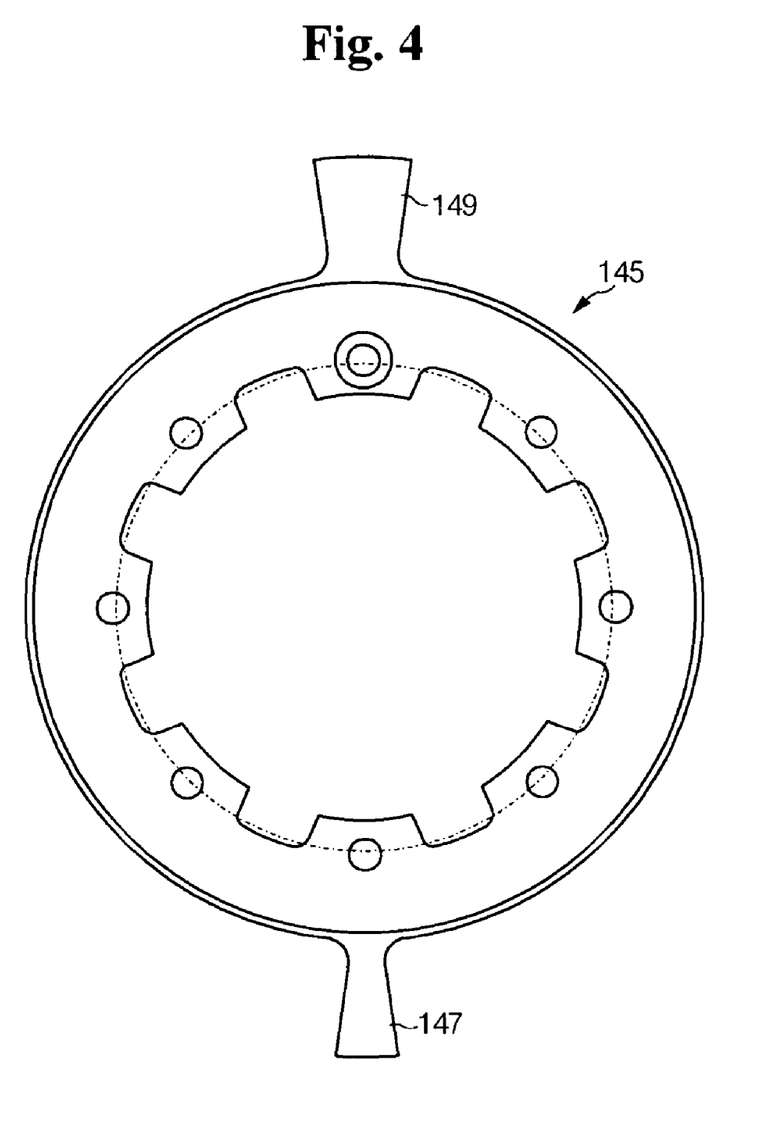

As shown in FIGS. 1 and 2, a drive plate 145 is fixedly coupled to the secondary mass 103, such that the drive plate 145 can compress the damping unit 129. As shown in FIGS. 3 and 4, the drive plate 145 has a ring shape, and first and second compression fins 147 and 149 are oppositely provided on an outer circumference of the drive plate 145. The compression fins 147 and 149 are positioned within the ring-shaped chamber 117, and have shapes and sizes that facilitate movement in the ring-shaped chamber 117. If a relative rotation between the primary and secondary masses 101 and 103 occurs, the compression fins 147 and 149 compress the damping unit 129 disposed within the divided portion of the ring-shaped chamber 117, so that damping occurs.

As shown in FIGS. 2 and 4, the first and second compression fins 147 and 149 have different widths, so that the damping units are sequentially compressed. Accordingly, a two-step damping characteristic can be realized. However, it will be appreciated by one of ordinary skill in the art that a multiple step damping can be realized.

Figure 5:
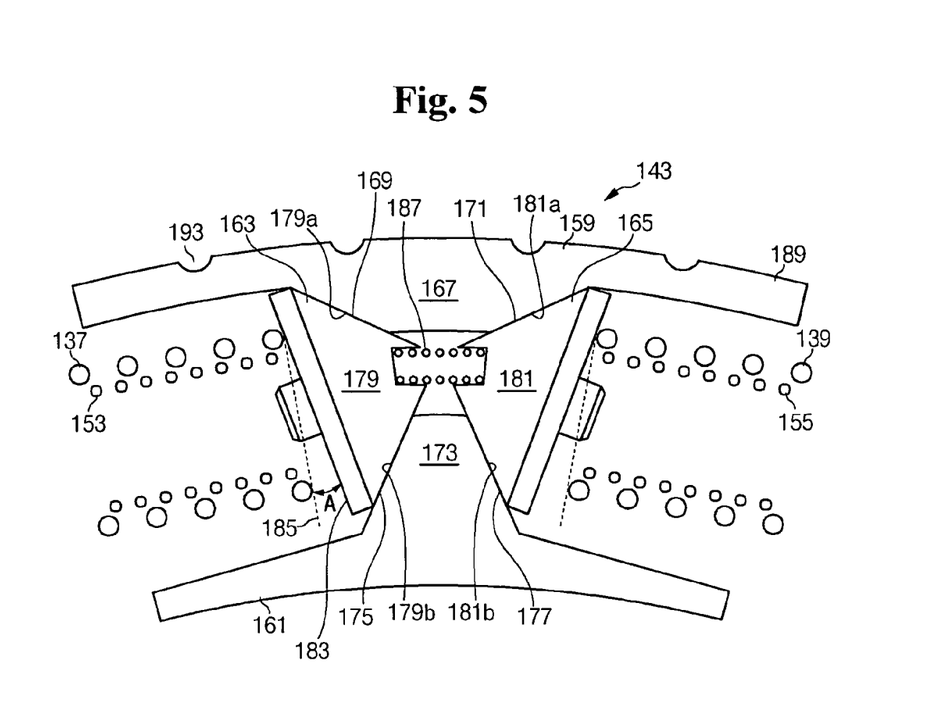
FIG. 5 shows a friction member of the torsional vibration damper of FIG. 1.
Figure 6:
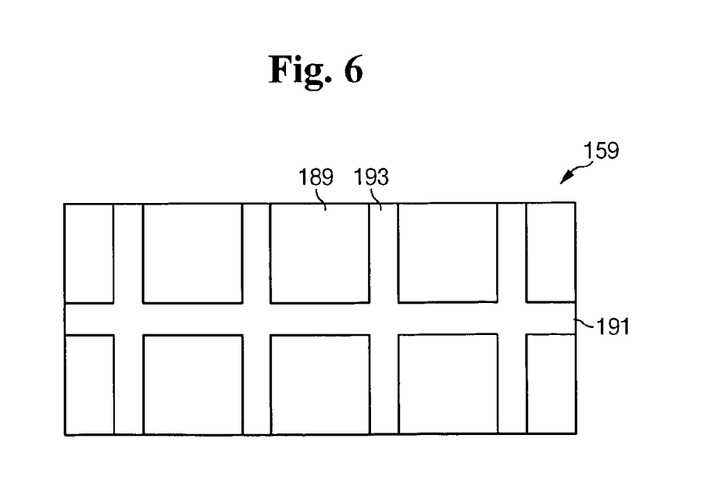
FIG. 6 shows a planar view of an outer surface of the friction member of the torsional vibration damper of FIG. 5.

Referring to FIGS. 5 and 6, the friction member 143 of the torsional vibration damper 100 will be explained. In the embodiment shown in FIG. 2, the number of friction members is three, but it is evident that the number of friction members is not restricted thereto.

The friction member 143 includes an outer guide 159, an inner guide 161, a first operator 163, and a second operator 165. The outer and inner guides 159 and 161 are disposed to face each other and a protrusion 167, extending toward a center point of the primary mass 101, i.e., the inner guide 161, is formed substantially at a center portion of the outer guide 159. Slanted surfaces 169 and 171 are provided on both sides of the protrusion 167. Similarly, a protrusion 173, extending toward the outer guide 159, is formed substantially at a center portion of the inner guide 161. Slanted surfaces 175 and 177 are provided on both sides of the protrusion 173.

As shown in FIG. 5, a first operator 163 and a second operator 165 are respectively disposed to face each other between the outer and inner guides 159 and 161. One end of the first operator 163 is elastically supported by the coil spring 137 and a slanted portion 179 is provided on the other end of the first operator 163. An outer slanted surface 179a of the slanted portion 179 of the first operator 163 contacts the slanted portion 169 of the outer guide 159, and an inner slanted surface 179b of the slanted portion 179 of the first operator 163 contacts the slanted portion 175 of the inner guide 161.

One end of the second operator 165 is elastically supported by the coil spring 139, and a slanted portion 181 is provided on the other end of the second operator 165. An outer slanted surface 181a of the slanted portion 181 of the second operator 165 contacts the slanted portion 171 of the outer guide 159, and an inner slanted surface 181b of the slanted portion 181 of the second operator 165 contacts the slanted portion 177 of the inner guide 161.

As shown in FIG. 5, a width of the protrusion 167 of the outer guide 159 becomes gradually narrower as it approaches a center of the primary mass 101, i.e., the inner guide 161, and a width of the protrusion 173 of the inner guide 161 becomes gradually narrower as it approaches the outer guide 159. Preferably, decreasing rates of widths of the protrusion 167 of the outer guide 159 and the protrusion 173 of the inner guide 161 are different from each other. Accordingly, hysteresis of the outer guide 159 and the inner guide 161 can be regulated. More preferably, the decreasing rate of the width of the protrusion 167 of the outer guide 159 is greater than that of the protrusion 173 of the inner guide 161.

If the coil springs 137 and 139 are compressed by a relative rotation between the primary and secondary masses 101 and 103, compression force is transmitted to the first and second operators 163 and 165. Accordingly, the first and second operators 163 and 165 close toward each other while they climb the slanted surfaces 169 and 171 of the outer guide 159 and slanted surfaces 175 and 177 of the inner guide 161. Consequently, the outer guide 159 radially moves outside the ring-shaped chamber 117, and the inner guide 161 radially moves inside the ring-shaped chamber 117. Therefore, the outer guide 159 contacts an outer wall 199 of the ring-shaped chamber 117, and the inner guide 161 contacts an inner wall 198 of the ring-shaped chamber 117, thereby generating friction therebetween.

As a relative rotation between the primary and secondary masses 101 and 103 becomes greater, the friction force between the friction member 143 and the outer and inner walls 199 and 198 of the ring-shaped chamber 117, i.e., friction force between the friction member 143 and the primary mass 101 increases. Consequently, a damping characteristic, in proportion to the relative rotation between the primary and secondary masses 101 and 103, can be achieved.

Preferably, a contacting surface 183 of the first operator 163 is slanted such that an end surface 185 of the coil spring 137 and the contacting surface 183 of the first operator 163 form a predetermined angle A therebetween, when the coil spring 137 is not compressed. That is, when the damping unit 129 is not compressed by the drive plate 145, an outer end portion of the coil spring 137, that elastically supports the first operator 163, contacts the first operator 163, and an inner end portion thereof does not contact the first operator 163.

Thus, when the coil spring 137 is compressed, an outer portion of the coil spring 137 is compressed first so that the coil spring 137 bends such that a center portion thereof moves toward the center portion of the primary mass 101. Such bending of the coil spring 137 can counterbalance bending of the coil spring 137 due to centrifugal force of the coil spring 137 during the rotation of the torsional vibration damper 100.

The second operator 165 and the coil spring 139 have the same structure and are connected in a similar way, therefore, the description of one component can equally be applied to the other component and a separate description is not necessary.

The first and second operators 163 and 165 are elastically supported by each other through the regulating coil spring 187 disposed between the first and second operators 163 and 165. The first and second operators 163 and 165 approach each other above a specific torque, defined by the strength of the spring 187. Consequently, friction force between the friction member 143 and the primary mass 101 is generated only above the specific torque.

Preferably, a first groove 191 and a second groove 193 are formed on an outer surface 189 of the outer guide 159, as shown in FIG. 6.

The first groove 191 is formed along a circumferential direction of the ring-shaped chamber 117, and the second groove 193 is formed along a direction perpendicular to the direction of the first groove 191. The first groove 191 plays a role of a lubrication oil passageway, and the second groove 193 scrapes a lubrication oil film existing on the outer wall 199 of the ring-shaped chamber 117 so that a thickness of the lubrication oil film can be maintained to be substantially constant.

Figure 7:
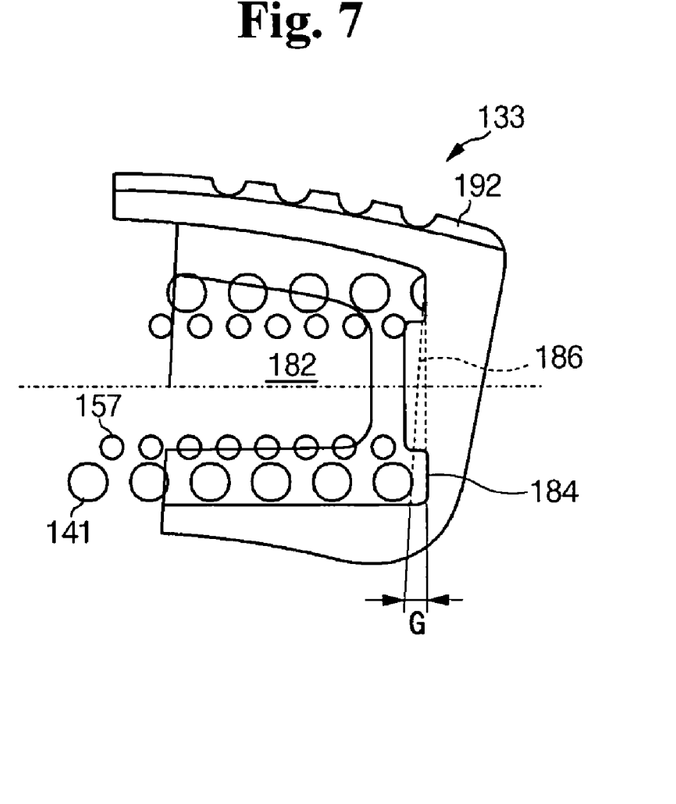
FIGS. 7 and 8 show an end guide of the torsional vibration damper of FIG. 1.

As shown in FIG. 7, a contacting surface 184 of a coil spring receiving hole 182 of the end guide 133 contacting the coil spring 141 is formed to be slanted, such that an end surface 186 and the contacting surface 184 of the end guide 133 form a predetermined angle G when the coil spring 141 is not compressed. That is, when the damping unit 129 is not compressed by the drive plate 145, an outer end portion of the coil spring 141 that elastically supports the end guide 133 contacts the contacting surface 184, and an inner end portion of the coil spring 141 does not contact the contacting surface 184. When the damping unit 129 is not compressed by the drive plate 145, an outer end portion of the coil spring 141, that elastically supports the end guide 133, contacts the contacting surface 184 and an inner end portion thereof does not contact the contacting surface 184.

Figure 8:
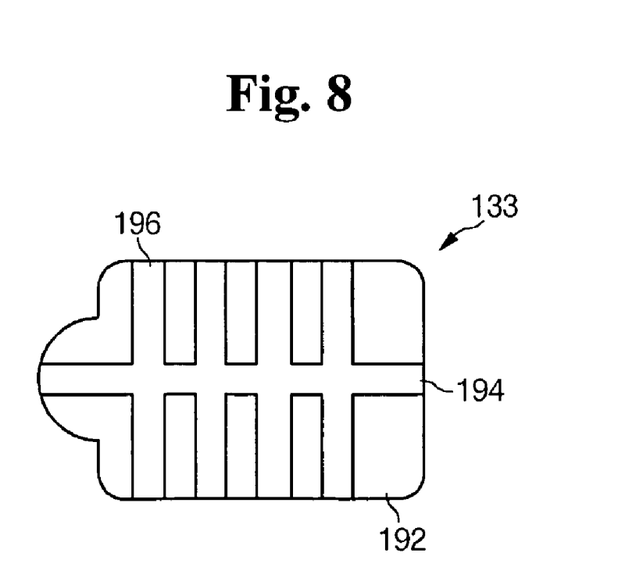

As shown in FIG. 8, a first groove 194 is formed on an outer surface 192 of the end guide 133 along a circumferential direction of the ring-shaped chamber 117, and a second groove 196 is formed along a direction perpendicular to the direction of the first groove 194. The first groove 194 provides a lubrication oil passageway and the second grooves 196 scrapes a lubrication oil film existing on the outer wall 199 of the ring-shaped chamber 117 so that a thickness of the lubrication oil film can be maintained to be substantially constant. The other end guide 131 includes the same structure with the end guide 133.

Hereinafter, other preferred embodiments of the present invention will be explained. The same reference numerals will be used to represent same components as shown in FIGS. 1-6.

Figure 9:
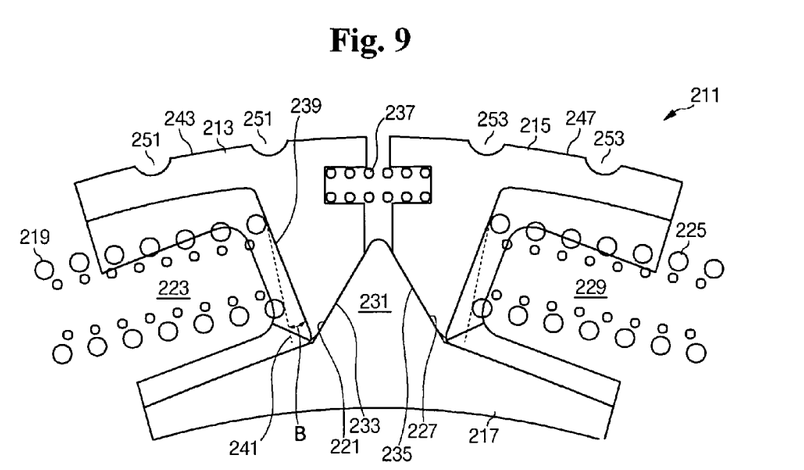
FIGS. 9 and 10 show a friction member of a torsional vibration damper according to another embodiment of the present invention.
Figure 10:
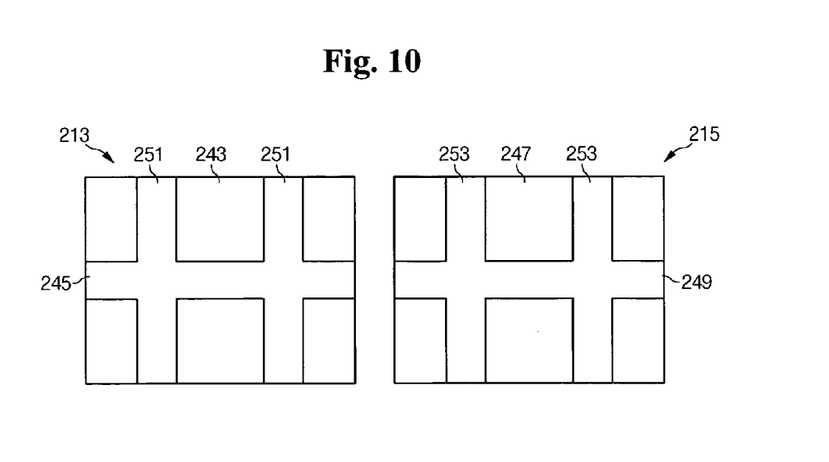

Referring to FIGS. 9 and 10, a friction member 211 of the damping unit of the torsional vibration damper according to another embodiment of the present invention, includes a first outer guide 213, a second outer guide 215, and an inner guide 217. One end of the first outer guide 213 is elastically supported by a coil spring 219, and the other end thereof is provided with a slanted surface 221. As an example, a coil spring receiving hole 223 is formed on the first outer guide 213, and the coil spring 219 is inserted into the coil spring receiving hole 223. Similarly, one end of the second outer guide 215 is elastically supported by a coil spring 225, and the other end thereof is provided with a slanted surface 227. A coil spring receiving hole 229 is formed on the second outer guide 215, and the coil spring 225 is inserted into the coil spring receiving hole 229.

The second outer guide 215 is disposed adjacent to the first outer guide 213 along a circumferential direction of the ring-shaped chamber 117. The inner guide 217 is disposed to face the first and second outer guides 213 and 215. A protrusion 231 extending toward the first and second outer guides 213 and 215 is formed at a center portion of the inner guide 217. As shown in FIG. 9, slanted surfaces 233 and 235 are formed on both sides of the protrusion 231.

The slanted surface 233 that is shown on the left in the drawing contacts the slanted surface 221 of the first outer guide 213, and the slanted surface 235 that is shown on the right in the drawing contacts the slanted surface 227 of the second outer guide 215. As shown in FIG. 9, a width of the protrusion 231 becomes smaller as it becomes more distant from a center of the primary mass 101.

If the coil springs 219 and 225 are compressed, the first and second outer guides 213 and 215 approach each other by compression force. At this time, the first outer guide 213 climbs the left slanted surface 233 of the protrusion 213 of the inner guide 217, and the second outer guide 215 climbs the right slanted surface 235 of the inner guide 217. Consequently, the first and second outer guides 213 and 215 are forced to move in a radial outward direction of the ring-shaped chamber 117, and the inner guide 217 is forced to move in a radial inward direction of the ring-shaped chamber 117. Upon moving a predetermined distance, the first and second outer guides 213 and 215 contact the outer wall 199 of the ring-shaped chamber 117 so that friction force is generated therebetween, and the inner guide 217 contacts the inner wall 198 of the ring-shaped chamber 117, generating a friction force therebetween.

Accordingly, damping characteristics in proportion to degrees of compression of the coil springs 219 and 225 can be achieved.

Preferably, the first and second outer guides 213 and 215 are elastically supported by each other through a regulating coil spring 237 disposed between the first and second outer guides, 213 and 215. The first and second outer guides 213 and 215 approach each other when the closing force overcomes the force of the regulating coil spring 237. Consequently, friction force between friction member 211 and the primary mass 101 is generated only above this specific closing force or torque.

A contacting surface 239 of the coil spring receiving hole 223 of the first outer guide 213 for contacting the coil spring 219 is slanted so that an end surface 241 of the coil spring 219 and the contacting surface 239 form a predetermined angle G when the coil spring 219 is not compressed. When the damping unit 129 is not compressed by the drive plate 145, an outer end portion of the coil spring 219 contacts the contacting surface 239 and an inner end portion of the coil spring 219 does not contact the contacting surface 239 of the first outer guide 213.

Thus, when the coil spring 219 is compressed, an outer portion of the coil spring 219 is compressed prior to an inner portion of the coil spring 219 so that the coil spring 219 bends and a center portion thereof moves toward the center portion of the primary mass 101. Such bending of the coil spring 219 can counterbalance bending of the coil spring 219 due to centrifugal force upon the coil spring 219 during the rotation of the torsional vibration damper 100. The second outer guide 215 and the coil spring 225 are connected in a similar way.

According to FIG. 10, a first groove 245 is formed on an outer surface 243 of the first outer guide 213 along a circumferential direction of the ring-shaped chamber 117 and a second groove 249 is formed on an outer surface 247 of the second outer guide 215 along a circumferential direction of the ring-shaped chamber 117. In addition, a third groove 251 is formed on the outer surface 243 of the first outer guide 213 along a direction perpendicular to the direction of the first groove 245, and a fourth groove 253 is formed on the outer surface 247 of the second outer guide 215 along a direction perpendicular to the direction of the second groove 249.

The first and second grooves 245 and 249 provide a lubrication oil passageway, and the third and fourth grooves 251 and 253 scrape excess lubrication oil film existing on the outer wall 199 of the ring-shaped chamber 117 so that a thickness of the lubrication oil film can be maintained to be substantially constant.

Figure 11:
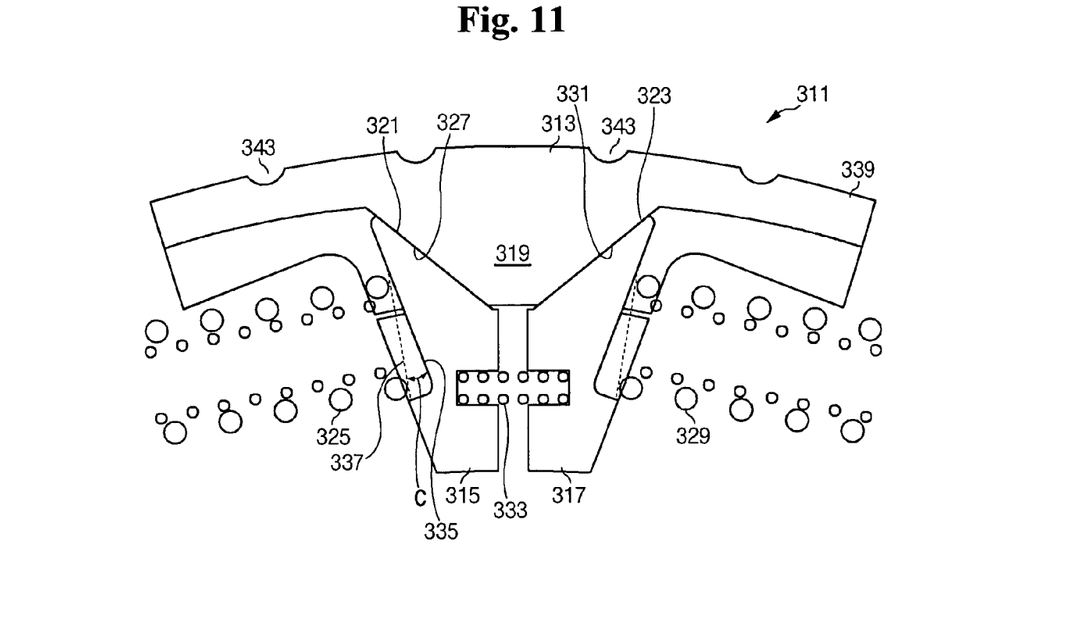
FIGS. 11 and 12 show a friction member of a torsional vibration damper according to yet another embodiment of the present invention.
Figure 12:
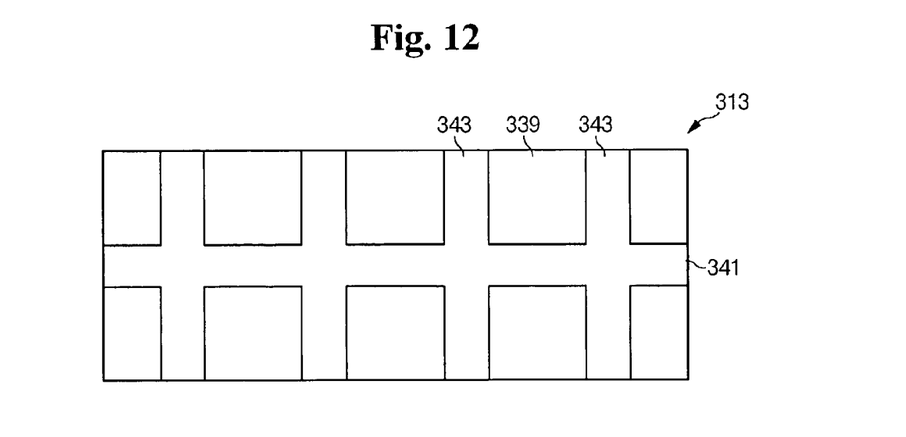

Referring now to FIGS. 11 and 12, a friction member 311 of the damping unit of the torsional vibration damper according to an alternative embodiment includes an outer guide 313, a first inner guide 315, and a second inner guide 317. A protrusion 319 extending toward a center portion of the primary mass 101 is formed at a center portion of the outer guide 313. As shown in FIG. 11, slanted surfaces 321 and 323 are provided on both sides of the protrusion 319.

One end of the first inner guide 315 is elastically supported by a coil spring 325, and a slanted surface 327 is formed on the other end of the first inner guide 315. Similarly, one end of the second inner guide 317 is elastically supported by a coil spring 329, and a slanted surface 331 is formed on the other end of the second inner guide 317. The second inner guide 317 is disposed adjacent to the first inner guide 315 along a circumferential direction of the ring-shaped chamber 117.

The slanted surface 327 of the first inner guide 315 contacts the slanted surface 321 of the protrusion 319 of the outer guide 313 that is shown on the left in the drawing, and the slanted surface 331 of the second inner guide 317 contacts the slanted surface 323 of the protrusion 319 of the outer guide 313 that is shown on the right in the drawing. A width of the protrusion 319 becomes smaller as it becomes closer to a center of the primary mass 101.

If the coil springs 325 and 329 are compressed, the first and second inner guides 315 and 317 approach each other by compression force. At this time, the outer guide 313 climbs the slanted surfaces 327 and 331 of the first and second inner guides 315 and 317. Consequently, the outer guide 313 is forced to move in a radial outward direction of the ring-shaped chamber 117, and the first and second inner guides 315 and 317 are force to move in a radial inward direction of the ring-shaped chamber 117. Therefore, the outer guide 313 contacts the outer wall 199 of the ring-shaped chamber 117 so that friction force is generated therebetween, and the first and second inner guides 315 and 317 contact the inner wall 198 of the ring-shaped chamber 117 so that friction force is generated therebetween. Accordingly, damping characteristics in proportion to degrees of compression of the coil springs 325 and 329 can be achieved.

Preferably, a regulating coil spring 333 is disposed between the first and second inner guides 315 and 317.

The first and second inner guides 315 and 317 are elastically supported to each other through a regulating coil spring 333 disposed therebetween. The first and second inner guides 315 and 317 approach each other when a closing force or torque becomes greater than the resistive force of the regulating coil spring 333. Consequently, friction force between friction member 311 and the primary mass 101 is generated only above the specific torque.

A contacting surface 335 of the first inner guide 315 contacting the coil spring 325 is slanted, so that an end surface 337 of the coil spring 325 and the contacting surface 335 of the first inner guide 315 form a predetermined angle C when the coli spring 325 is not compressed. When the damping unit 129 is not compressed by the drive plate 145, an outer end portion of the coil spring 325 contacts the contacting surface 335 of the first inner guide 315, and an inner end portion of the coil spring 325 does not contact the contacting surface 335 of the first inner guide 315. Thus, when the coil spring 325 is compressed, an outer portion of the coil spring 325 is compressed prior to an inner portion of the coil spring 325 so that the coil spring 325 bends such that a center portion thereof moves toward the center portion of the primary mass 101. Therefore, such bending of the coil spring 325 can counterbalance bending of the coil spring 325 due to centrifugal force of the coil spring 325 during the rotation of the torsional vibration damper 100. The second inner guide 317 and the coil spring 329 are connected in a similar way.

According to FIG. 12, a first groove 341 and a second groove 343 are formed on an outer surface 339 of the outer guide 313. The first groove 341 is formed along a circumferential direction of the ring-shaped chamber 117, and the second groove 343 is formed along a direction perpendicular to the direction of the first groove 341. The first groove 341 provides a lubrication oil passageway, and the second groove 343 scrapes excess lubrication oil film existing on the outer wall 199 of the ring-shaped chamber 117 so that a thickness of the lubrication oil film can be maintained to be substantially constant.

Figure 13:
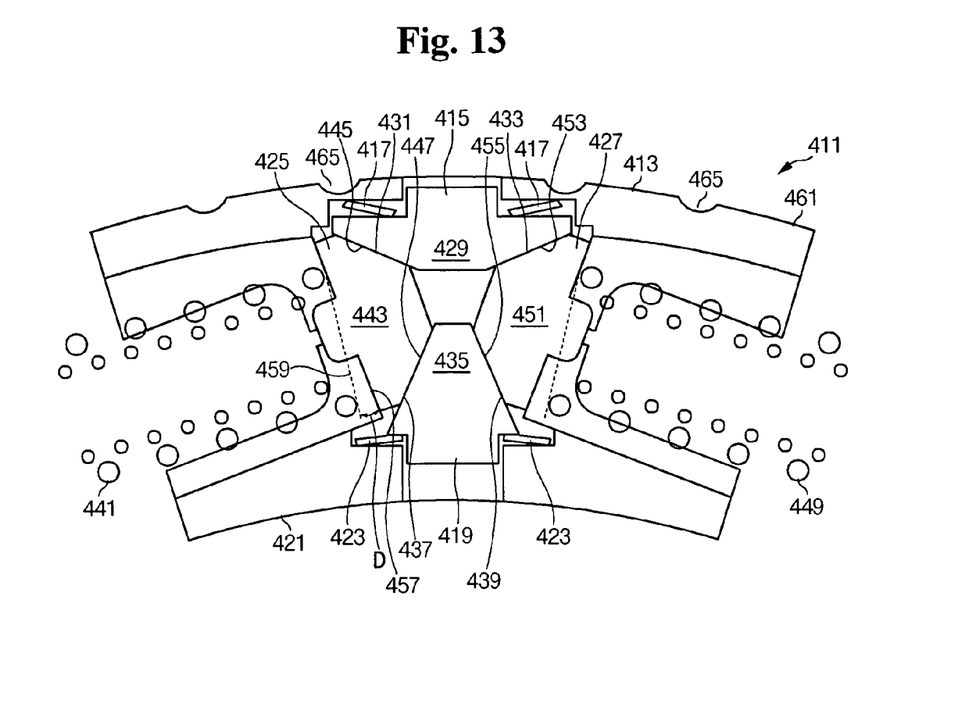
FIGS. 13 and 14 show a friction member of a torsional vibration damper according to still another embodiment of the present invention.
Figure 14:
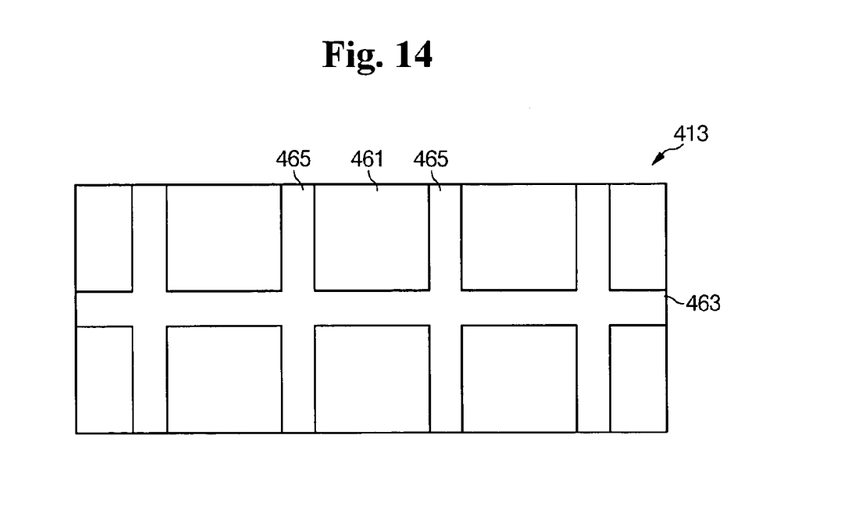

According to FIGS. 13 and 14, a friction member 411 of the damping unit of the torsional vibration damper according to another embodiment includes an outer guide 413, an outer wedge 415, a first elastic unit 417, an inner wedge 419, an inner guide 421, a second elastic unit 423, a first operator 425, and a second operator 427.

The outer wedge 415 is disposed adjacent to the outer guide 413, and a slanted portion 429 extending toward the center of the primary mass 101 is formed at a center portion of the outer wedge 415. Slanted portions 431 and 433 are formed on both sides of the slanted portion 429 of the outer wedge 415, and a width of the slanted portion 429 becomes smaller as it becomes closer to the center of the primary mass 101. The first elastic unit 417 is disposed between the outer guide 413 and the outer wedge 415. The first elastic unit 417 may include an arbitrary member that can provide elastic force, and as an example, the first elastic unit 417 can be a disc spring. Friction force generated by the friction member 411 can be regulated by regulating a friction coefficient of the first elastic unit 417 that elastically supports the outer guide 413 and the outer wedge 415.

The inner wedge 419 is disposed to face the outer wedge 415. A slanted portion 435 extending toward the outer wedge 415 is provided at a center portion of the inner wedge 419. Slanted surfaces 437 and 439 are formed on both sides of the slanted portion 435 of the inner wedge 419, and a width of the slanted portion 435 becomes smaller as it becomes more distant from the center of the primary mass 101. Preferably, a rate of decrease of the width of the slanted portion 429 of the outer wedge 415 is different from a rate of decrease of the width of the slanted portion 435 of the inner wedge 419. Further preferably, the rate of decrease of the width of the slanted portion 429 of the outer wedge 415 is greater than that of the slanted portion 435 of the inner wedge 419. The inner guide 421 is disposed adjacent to the inner wedge 419.

The second elastic unit 423 is disposed between the inner guide 421 and the inner wedge 419. The second elastic unit 423 may include an arbitrary member that can provide elastic force, and as an example, the second elastic unit 423 can be a disc spring. The first operator 425 is disposed between the outer wedge 415 and the inner wedge 419. One end of the first operator 425 is elastically supported by a coil spring 441, and a slanted portion 443 that is configured to contact the slanted portion 429 of the outer wedge 415 and the slanted portion 435 of the inner wedge 419 is provided on the other end of the first operator 425.

Slanted surfaces 445 and 447 are formed on both sides of the slanted portion 443 of the first operator 425. The outer slanted surface 445 contacts the slanted surface 431 of the outer wedge 415, and the inner slanted surface 447 contacts the slanted surface 437 of the inner wedge 419.

The second operator 427 is disposed to face the first operator 425 between the outer and inner wedges 415 and 419. One end of the second operator 427 is elastically supported by a coil spring 449, and a slanted portion 451 that is configured to contact the slanted portion 429 of the outer wedge 415 and the slanted portion 435 of the inner wedge 419 is provided on the other end of the second operator 427. Slanted surfaces 453 and 455 are formed on both sides of the slanted portion 451 of the second operator 427. The outer slanted surface 453 contacts the slanted surface 433 of the outer wedge 415, and the inner slanted surface 455 contacts the slanted surface 439 of the inner wedge 419.

The coil springs 441 and 449 are compressed by a relative rotation between the primary and secondary masses 101 and 103, the compression force is transmitted to the first and second operators 425 and 427. By the compression force, the first and second operators 425 and 427 becomes closer to each other while climbing the slanted portion 429 of the outer wedge 415 and the slanted portion 435 of the inner wedge 419. Accordingly, the outer wedge 415 is forced to move in a radial outward direction and the inner wedge 419 is forced to move in a radially inward direction. Consequently, the outer guide 413 moves in a radial outward direction of the ring-shaped chamber 117, and the inner guide 421 moves in a radial inward direction of the ring-shaped chamber 117. Therefore, the outer guide 413 contacts the outer wall 199 of the ring-shaped chamber 117 so that friction force is generated, and the inner guide 421 contacts the inner wall 198 of the ring-shaped chamber 117 so that friction force is generated.

As a relative rotation between the primary and secondary masses 101 and 103 increases, friction force between the friction member 411 and the outer and inner walls 199 and 198 of the ring-shaped chamber 117, i. e., between the friction member 411 and the primary mass 101, also increases. Therefore, damping characteristics in proportion to the relative rotation can be achieved.

A contacting surface 457 of the first operator 425 contacting the coil spring 441 is slanted, so that an end surface 459 of the coil spring 441 and the contacting surface 457 of the first operator 425 form a predetermined angle D when the coil spring 441 is not compressed. That is, when the damping unit 129 is not compressed by the drive plate 145, an outer end portion of the coil spring 441 contacts the first operator 425, and an inner end portion of the coil spring 441 does not contact the first operator 425. Thus, when the coil spring 441 is compressed, an outer portion of the coil spring 441 is compressed prior to an inner portion of the coil spring 441 so that the coil spring 441 bends such that a center portion thereof moves toward the center portion of the primary mass 101. Therefore, such bending of the coil spring 441 can counterbalance bending of the coil spring 441 due to centrifugal force of the coil spring 441 during the rotation of the torsional vibration damper 100.

The second operator 427 and the coil spring 449 are connected in a similar way.

As shown in FIG. 14, a first groove 463 and a second groove 465 are formed on an outer surface 461 of the outer guide 413. The first groove 463 is formed along a circumferential direction of the ring-shaped chamber 117, and the second groove 465 is formed along a direction perpendicular to the direction of the first groove 463. The first groove 463 plays a role of a lubrication oil passageway, and the second groove 465 scrapes a lubrication oil film existing on the outer wall 199 of the ring-shaped chamber 117 so that a thickness of the lubrication oil film can be maintained to be substantially constant.

Although preferred embodiments of the present invention have been described in detail hereinabove, it should be clearly understood that many variations and/or modifications of the inventive concepts herein taught which may appear to those skilled in the present art will still fall within the spirit and scope of the present invention as defined in the appended claims.

What is claimed is:

1. A torsional vibration damper comprising:
a primary mass adapted to be coupled to an engine crankshaft for rotation about a rotational axis of the engine crankshaft, the primary mass defining a substantially ring-shaped chamber that is divided into at least two portions;
a secondary mass relatively rotatably connected to the primary mass and connectable with a clutch; and
a damping unit for coupling the primary and secondary masses to each other wherein the damping unit comprises;
a plurality of coil springs situated in series and disposed one after the other within the divided portions of the ring-shaped chamber;
a pair of end guides slidably disposed within each divided portion of the ring-shaped chamber and supporting outer ends of the coil springs among a plurality of elastic members; and
a friction member slidably disposed between neighboring elastic members, the friction member being configured to be rubbed against the primary mass in response to compressions of the coil springs such that a friction force is generated in proportion to a relative rotation between the primary and secondary masses;
wherein the friction member comprises:
an outer guide provided with a first protrusion extending toward a center portion of the primary mass such that a first slanted surface and a second slanted surface are formed on both sides of the first protrusion;
an inner guide disposed to face the outer guide and provided with a second protrusion extending toward the outer guide such that a third slanted surface and a fourth slanted surface are formed on both sides of the second protrusion;
a first operator disposed between the outer and inner guides, one end of the first operator being elastically supported by one of the plurality of the coil spring, and a first slanted portion respectively contacting the first slanted surface of the first protrusion and the third slanted surfaces of the second protrusion, the first slanted portion being provided on the other end of the first operator, wherein the first slanted portion and the first and third slanted surfaces are linear; and
a second operator disposed to face the first operator between the outer and inner guides, one end of the second operator being elastically supported by the other of the plurality of the coil spring, and a second slanted portion respectively contacting the second slanted surface of the first protrusion and the fourth slanted surfaces of the second protrusion, the second slanted portion being provided on the other end of the second operator, wherein the second slanted portion and the second and fourth slanted surfaces are linear, and
wherein a width of the first protrusion becomes smaller as it becomes closer to the center portion of the primary mass and a width of the second protrusion becomes smaller as it becomes more distant from the center portion of the primary mass.

2. The torsional vibration damper of claim 1, wherein a rate of decrease of the width of the first protrusion differs from a rate of decrease in width of the second protrusion.

3. The torsional vibration damper of claim 1, wherein a rate of decrease of the width of the first protrusion is greater than a rate of decrease of the second protrusion.

4. The torsional vibration damper of claim 1, wherein the friction member further comprises a regulating coil spring disposed between the first and second operators such that the first and second operators are elastically supported by each other.

5. The torsional vibration damper of claim 1, wherein an outer end portion of the coil spring supporting the first operator contacts the first operator and an inner end portion thereof does not contact the first operator when the damping unit is not compressed.

6. The torsional vibration damper of claim 1, wherein an outer end portion of the coil spring supporting the second operator contacts the second operator and an inner portion thereof does not contact the second operator when the damping unit is not compressed.

7. The torsional vibration damper of claim 1, further comprising a drive plate that is coupled to the secondary mass and is configured to compress the damping unit when a relative rotation between the primary and secondary masses occurs, and wherein at least two compression fins are provided on a circumference of the drive plate, and wherein widths of the compression fins are different from each other.

8. The torsional vibration damper of claim 1, wherein an outer end portion of the coil spring supporting the end guide contacts the end guide and an inner end portion thereof does not contact the end guide when the damping unit is not compressed.

9. The torsional vibration damper of claim 1, wherein the outer guide contacts an outer wall of the ring-shaped chamber and the inner guide contacts an inner wall of the ring-shaped chamber when the coil springs supporting the first and second operators are compressed.

10. The torsional vibration damper of claim 1, wherein at least one bushing is disposed between the primary and secondary masses.

11. The torsional vibration damper of claim 1, wherein the ring-shaped chamber is al least partially filled with lubrication oil.

12. The torsional vibration damper of claim 1, further comprising a drive plate that is coupled to the secondary mass and configured to compress the damping unit when a relative rotation between the primary and secondary masses occurs.

* * * * *